No. 606,705. Patented July 5, 1898.
J. CHASE.
PNEUMATIC TIRE COVER.
(Application filed May 14, 1898.)

(No Model.)

WITNESSES  INVENTOR

UNITED STATES PATENT OFFICE.

JESSE CHASE, OF OMRO, WISCONSIN.

PNEUMATIC-TIRE COVER.

SPECIFICATION forming part of Letters Patent No. 606,705, dated July 5, 1898.

Application filed May 14, 1898. Serial No. 680,700. (No model.)

*To all whom it may concern:*

Be it known that I, JESSE CHASE, a citizen of the United States, residing at Omro, in the county of Winnebago and State of Wisconsin, have invented certain new and useful Improvements in Pneumatic-Tire Covers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in pneumatic-tire covers; and the objects of my invention are, first, to protect the tire from wear; second, to prevent the tire from slipping sidewise when used upon icy roads.

My invention is adapted for use either upon cycles or sulkies provided with pneumatic tires; and it consists, essentially, of a canvas outer cover and a patch attached thereto, the cover, with its patch, extending entirely around the tire and the patch serving to prevent the wheel from swerving or slipping sidewise upon the snow or ice.

Figure 1:
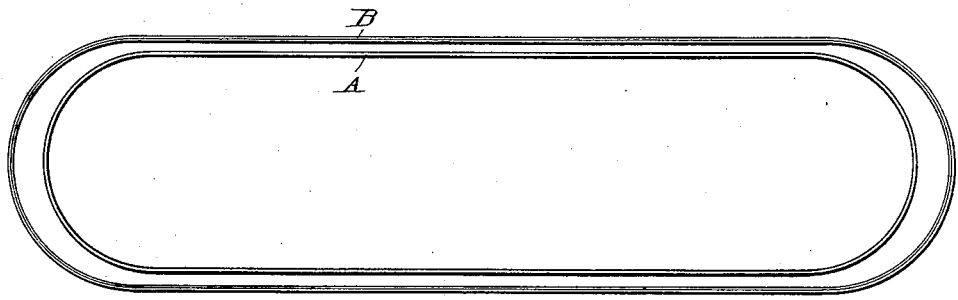
Figure 2:
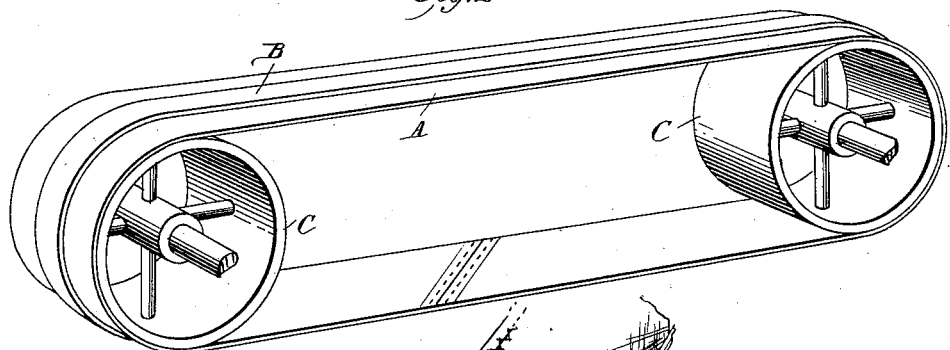
Figure 3:
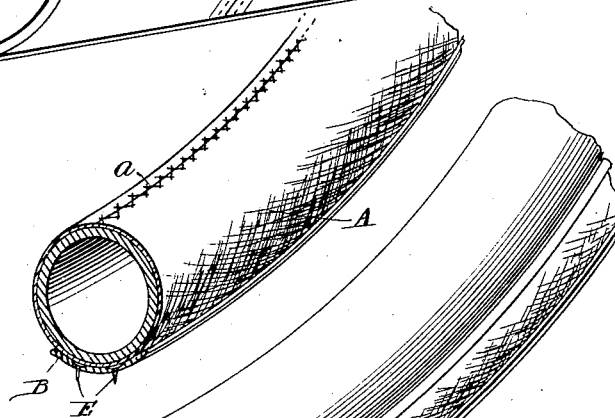
Figure 4:
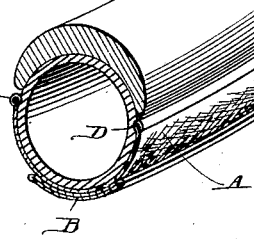

In the accompanying drawings, Figure 1 is a side elevation of a cover and patch in a separated condition as they appear before the patch is sewed to the cover. Fig. 2 is a perspective view of the cover and patch as they appear on the stretching-rollers and the patch ready to be sewed in place around the cover. Fig. 3 is a perspective view in section of a portion of a tire with the completed cover secured to the same by sewing or lacing and tacks projecting from the patch, and Fig. 4 is a perspective view in section of a portion of a tire and rim of a wheel with my improved cover secured to the same by means of wire hoops.

Similar letters refer to similar parts throughout the specification.

A in the drawings represents the cover, and B the patch, both of which are made of preferably very strong heavy canvas. The canvas constituting the cover is cut into a straight piece bias of the material, of a length equal to the circumference of the rim measured along the depression or hollow of the rim, and the ends of the material are then sewed together to form a circular strip. The patch consists of a strip of canvas cut straightwise of the cloth and of a length equal to the circumference of the inflated tire, and its ends are also sewed together to form a circular band. From the above it will be seen that the cover is somewhat shorter in length than the patch. It is necessary that the cover be cut on the bias in order to admit of its being stretched to a length equal that of the patch. It is preferable to cut the goods constituting the patch straightwise of the cloth, as it is not required to be stretched. The patch may be formed by folding the material into two or more folds, or it may be built up of several separate pieces of material, though I prefer to construct it of a single piece of material and then fold the same to the desired thickness. Rollers C C are provided, as shown in Fig. 2, upon which to stretch the cover proper. The rollers are set apart a distance equal to the length of the patch B, and the cover is stretched upon them, and the patch is then placed around the cover on the outside of the same and centrally of its width, and the cover, with the patch in position, is passed under the ordinary sewing-machine (not shown) and the patch sewed to the cover, the tension of the machine feeding the goods along. After being removed from the rollers the edges of the cover will return to their normal position, but the central portion will be held by the patch, so that in placing the cover upon the tire the under side of the cover will not buckle up or wrinkle, and the whole cover will accommodate itself to the surface of the tire and become inflated when the tire is inflated. All danger of the cover creeping upon the tire will thus be avoided. The completed cover may be secured to the tire in any suitable manner.

In Fig. 3 I show the preferred manner of securing the cover to the tire, which consists in sewing or lacing the ends of the cover together, as at *a*, around the under side of the tire. By this construction the cover will be held securely in position, and when it is inflated with the tire all liability of the cover becoming loose or creeping on the tire will be avoided. In this condition the cover and tire may be cemented to the rim in the ordinary manner, if desired. In some instances it may be practical to dispense with the sewing or lacing and cement the cover to the tire.

In Fig. 4 I have shown the cover secured to the tire by means of wire hoops D, which are embedded or otherwise secured to the edges of the cover. By this construction when the tire is inflated the hoops will bear upon the under side of the tire just above the rim of the wheel and hold the cover securely in place.

In Fig. 3 I have shown tacks E, projecting from the patch. These will be found useful in winter racing upon ice, with sulkies provided with pneumatic tires, as the tacks will prevent the sulky from swerving or slipping sidewise. The tacks are preferably secured to the patch before it is sewed to the cover by inserting the head of the tack between the folds constituting the patch and forcing the point of the tack through the outer fold or folds.

After the cover is completed and before it is applied to a tire it may be painted with or soaked in waterproof paint.

It will be observed that the edges of the patch extend slightly above the cover, and in use they cut the snow or ice sufficiently to prevent slipping sidewise.

I regard as an important feature of my invention the method of producing the cover, which consists, first, in cutting the cover portion proper on the bias, so that it can be stretched to the desired extent and cutting the patch portion straightwise of the cloth, so that it cannot be stretched to any considerable extent, the cover portion being cut of a length equal to the circumference of the rim measured in the depression or hollow of the rim and cutting the patch portion of a length equal to the circumference of the outer periphery of the inflated tire, then stretching the cover portion upon the rollers to keep it stretched to the size of the patch portion for sewing, and then sewing the patch onto the cover while the cover is in a stretched position.

While I have described and shown the cover cut on the bias and have found this to be the most practical way to produce the article when it is made of canvas, yet it might be possible to use a material for the cover proper which was sufficiently elastic and not required to be cut on the bias, the spirit of my invention being to have the outer cover normally of a length shorter than that of the strip constituting the patch and to stretch the cover proper to a length equal to that of the patch and while in a stretched condition to secure the patch to the same, so that when the tension on the cover proper is removed the patch will hold the central portion of the cover in a stretched condition, while the edges are free to return to their normal position.

Having now described my invention, what I claim as new, and desire to secure by Letters Patent, is—

1. A cover for a tire, comprising in its construction, a strip of material of suitable length and width, which is cut on the bias and has its ends secured together, and a second strip, constituting a patch, which is cut straightwise of the goods and secured on top of the first-mentioned piece of material, while the latter is in a stretched condition, substantially as described.

2. A cover for a tire, comprising in its construction, a strip of material of suitable length and width, which is cut on the bias and has its ends secured together, and a second strip, constituting a patch, which is cut straightwise of the goods and secured on top of the first-mentioned piece of material, while the latter is in a stretched condition, the patch being of less width than the cover portion proper and formed by folding the material, substantially as described.

3. A cover for a tire, comprising in its construction, a strip of material of suitable length and width, which is cut on the bias and has its ends secured together, and constituting a cover proper, and a second strip, constituting the patch, which is cut straightwise of the goods and secured on top of the first-mentioned piece of material, while the latter is in a stretched condition, the patch being of less width than the cover portion proper and formed by folding the material, tacks placed in the folds of the patch with their points projecting outwardly from the patch, substantially as described.

4. In combination with a tire, a cover comprising in its construction a strip of material of suitable length and width, which is cut on the bias and has its ends secured together, a second strip, constituting a patch, which is cut straightwise of the goods and secured on top of the first-mentioned piece of material, while the latter is in a stretched condition, and means for securing the cover to the tire, substantially as described.

5. In combination with a tire, a cover comprising in its construction, a strip of material of suitable length and width which is cut on the bias and has its ends secured together, and a second strip, constituting a patch, which is cut straightwise of the goods and secured on top of the first-mentioned piece of material, while the latter is in a stretched condition, the cover enveloping the tire and secured thereto by lacing or sewing, substantially as described.

6. In combination with a tire, a cover comprising in its construction, a strip of material of suitable length and width which is cut on the bias and has its ends secured together, and a second strip, constituting a patch, which is cut straightwise of the goods and secured on top of the first-mentioned piece of material, while the latter is in a stretched condition, wire hoops secured to the cover, the cover enveloping the tire and being held in place by said hoops, substantially as described.

In testimony whereof I affix my signature in presence of two witnesses.

JESSE CHASE.

Witnesses:
F. J. McKENNEY,
CHAS. J. SCHMITT.